3,780,135
INTRODUCING CATALYST INTO A REACTOR
Robert J. Perry, Bartlesville, Okla., assignor to Phillips Petroleum Company, Bartlesville, Okla.
Filed July 21, 1970, Ser. No. 56,931
Int. Cl. C08f 1/42
U.S. Cl. 260—878 B 7 Claims

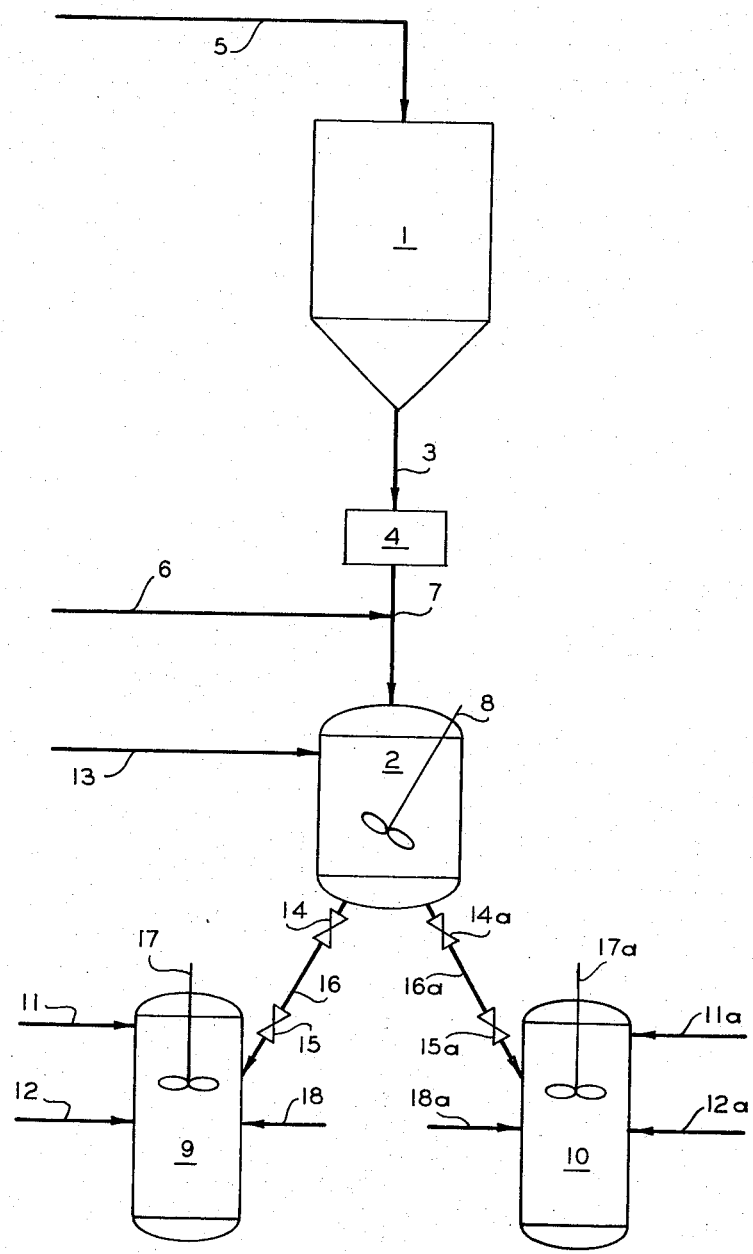

ABSTRACT OF THE DISCLOSURE

A material charge required in a batch reaction is introduced into and maintained in a dispersion zone in uniform, low-concentration, dispersed form until required in the batch reaction zone, at which time the entire charge is introduced into said batch reaction zone in a single step.

---

This invention relates to catalytic reactions. It further relates to the introduction of catalyst into a reactor. It specifically relates to a method for introducing into a reactor the entire quantity of pre-measured catalyst component, in dilute slurried form, required in the batch copolymerization of propylene and ethylene.

In the batch copolymerization of propylene and ethylene a catalyst is utilized to promote the polymerization reaction. It is well known that the polymerization is quite sensitive to the quantity of catalyst utilized, and it is also known that the reproducibility of copolymer properties from batch to batch is dependent upon the accuracy with which the total quantity of catalyst component is controlled from batch to batch. Accordingly, advantage has been taken of this knowledge of devising methods and apparatus for accurate catalyst feeding and for provision of positive catalyst feed to the reactor. One such apparatus for metering catalyst to a reactor is set out in U.S. Pat. 3,167,398. After a measured quantity of catalyst is passed through the metering equipment, it has, according to the practice of the prior art, been immediately transferred to the reaction vessel by some means, such as by mixing with a flowing inert diluent. This technique of transferring the catalyst charge from the metering equipment directly to the batch reactor by diluent sweep has met with limited success in that one problem now discovered in this technique is that multiple-step addition of catalyst component to a batch reactor can also result in nonreproducible copolymer properties from batch to batch even though the total quantity of catalyst and other reactor ingredients does not vary from batch to batch.

Catalyst component while in storage and while passing through the metering equipment is ordinarily in a highly concentrated slurry form. It is desirable to reduce the slurry concentration prior to introduction of catalyst into the reactor as catalyst activity is enhanced by wide and uniform dispersion of the catalyst component throughout the reactor. Such dispersion can be achieved in multiple-step addition with flowing diluent, providing the flow rate of the diluent—which mixes with and dilutes the catalyst component—does not vary. However, variation in diluent flow rate causes variation in catalyst component dispersion with consequent variation in copolymer properties from batch to batch.

It is thus an object of this invention to provide an improved method for feeding slurried catalyst to a batch reactor.

Other objects, aspects, and the several advantages of this invention will be apparent to one skilled in the art upon studying the following specification, drawing and claims.

In accordance with this invention there is provided a process for the introduction into a reactor of a material component required in a batch reaction wherein the entire component is introduced in a single step. According to my invention a measured quantity of the material component is introduced into a dispersion zone with a measured quantity of diluent. In the dispersion zone, the entire component reactor charge is diluted and thoroughly mixed, so as to uniformly disperse the component, and it is contained therein until such time as the charge is required to be introduced into the reactor, at which time a gas inert to the charge is introduced into the dispersion zone under sufficient pressure to rapidly discharge, or blow, all of the dispersed material component within the dispersion zone into the reactor. Accordingly, by this invention, the entire material component charge required is introduced into the reactor in a single step. Since substantially equal charge quantities and substantially constant dispersion is made in the dispersion zone, prepartion of reaction products having reproducible properties from batch to batch is enhanced.

The process of this invention is fully explained below with reference to the handling of a specific catalyst component required in the batch copolymerization of propylene and ethylene. However, the specific materials and reactions involved in the explanation merely illustrate but do not limit my invention which, as previously pointed out, is a process for the single-step addition of a material component into a batch reaction.

Referring now to the figure, which is a flow diagram indicating the movement of a catalyst component useful in the copolymerization of propylene and ethylene from a storage zone through a metering zone to a dispersion zone and then to a reaction zone, catalyst component contained in catalyst storage zone 1 is transferred to dispersion zone 2 via conduit 3 which has disposed therein metering zone 4. The transfer from storage zone 1 to dispersion zone 2 is accomplished by utilizing an applied pressure drop between storage zone 1 and dispersion zone 2. The pressure differential is applied by introducing into storage zone 1 via conduit 5 a diluent inert to the catalyst. The pressure applied to storage zone 1 is sufficient to overcome any opposing pressure in dispersion zone 2. Accordingly, when metering zone 4 is open, catalyst will flow from storage zone 1 in conduit 3 to dispersion zone 2. Diluent inert to the catalyst, preferably the same utilized to transfer catalyst from storage zone 1, is introduced into conduit 3 at 7 between metering zone 4 and dispersion zone 2 via conduit 6 and sweeps the catalyst component which is in highly concentrated slurry form from metering zone 4 to dispersion zone 2.

The catalyst component contained in storage zone 1 can be a slurry having a high concentration of the catalyst component in diluent, preferably the diluent in line 5 used to transfer the component from zone 1 to zone 2. Catalyst component slurry passing metering zone 4 and diluent entering conduit 3 at 7 from conduit 6 are both introduced into dispersion zone 2, such as a vessel equipped with a dispersion or agitation means 8, until such time as the total quantity of catalyst component required in a given polymerization is introduced into dispersion zone 2, at which time the pressure applied by diluent in line 5 to storage zone 1 is terminated, and metering zone 4 is blocked or closed, thus ceasing the flow of slurry through metering zone 4. The flow of diluent in conduit 6 is continued until such time as the second slurry thus formed in dispersion zone 2 consists of a desirably low concentration of catalyst component in diluent. When the desired concentration of catalyst in dispersion zone 2 is obtained, the flow of diluent in line 6 is terminated. During the entire time that catalyst component and diluent are flowing in conduit 3 and being introduced into dispersion zone 2, dispersion means 8 is in constant operation in order to thoroughly disperse the catalyst component throughout the contents of dispersion zone 2 and to thereby produce a uniform concentration of catalyst component in diluent. Mixing proceeds in dispersion zone 2 at all times that dispersion zone 2 contains slurry. Slurry is maintained in dispersion zone 2 in uniform dispersed concentration until such time as the charge contained in dispersion zone 2 is required to be introduced into a reaction zone, for example, reaction zones 9 and 10.

Referring now to the operation of reaction zone 9 in connection with dispersion zone 2, reaction zone 9 is charged with monomer which enters via line 11, and any other desirable material such as a second catalyst component which enters via line 12. When reaction zone 9 is fully charged with all ingredients required for the batch polymerization of monomer and for the subsequent copolymerization of a second monomer to be added at a later time as hereafter described, the reaction zone conditions are adjusted to a suitable temperature and pressure required for polymerization. When propylene is being polymerized, desirable reaction zone conditions are 130° F. and 445 p.s.i.g. When the conditions in reaction zone 9 are thus prepared the catalyst component held in dispersion zone 2 is then introduced into reaction zone 9, under pressure applied by an inert gas which is introduced into dispersion zone 2 via line 13. The pressure in line 13 is sufficient to discharge the entire contents of dispersion zone 2 through valves 14 and 15 and line 16 into reaction zone 9. To insure complete discharge of the slurry from dispersion zone 2 into reaction zone 9, it is preferred that the pressure in line 13 exceed the pressure in reaction zone 9 by at least 50 p.s.i.g. Introduction of inert gas by line 13 is continued until line 16 as well as dispersion zone 2 contains only the inert gas. When this condition is reached, valve 15 is closed, followed by valve 14 and introduction of inert gas in line 13 is then terminated. At this point, dispersion zone 2 and line 16 contain only inert gas, and there is no flow in lines 13, 6, 5, and 3.

The entire slurry charge having been introduced into reaction zone 9, the polymerization therein begins and continues under mixing conditions, such as by operation of agitation means 17, for the period of time required to obtain the desired degree of polymerization of the first monomer introduced via line 11, at which time a second monomer is introduced into reaction zone 9 via line 18 which thus begins copolymerization of residual first monomer and newly introduced second monomer. When the first monomer is propylene, under the above-described conditions, and the second monomer is ethylene, the conditions in reaction zone 9 are adjusted to approximately 60° F. and 145 p.s.i.g., preparatory to the copolymerization step. It is noted that the introduction of slurry from dispersion zone 2 into reaction zone 9, as above described, supplies not only the quantity of catalyst component required in the homopolymerization, but also the quantity of catalyst required in the copolymerization.

During the operation of dispersion zone 2 with respect to reaction zone 9, reaction zone 10 is not thereby effected. Reaction zone 10 can be containing a polymerization reaction or awaiting introduction of catalyst component from dispersion zone 2, or it can be undergoing preparation for polymerization in the same manner as described with respect to reaction zone 9. The operation of reaction zone 10 is the same as the operation of reaction zone 9. Thus, the valves, lines and related equipment of reaction zone 10 carry parallel reference numbers as those of reaction zone 9. Accordingly, the functions of lines 11a, 12a, 16a and 18a, valves 14a and 15a, and agitator means 17a are the same as those described in the descriptions of lines 11, 12, 16, and 18, valves 14 and 15 and mixing means 17.

The entire charge of slurried catalyst component contained in dispersion zone 2 is introduced into a single reaction zone whether it be reaction zone 9 or 10. When dispersion zone 2 is completely emptied of a charge and contains only the inert gas from line 13 the concentrated slurry from storage zone 1 and the diluent from line 6 is again introduced into dispersion zone 2, valves 14 and 14a being closed, in preparation of a second catalyst component charge of concentration equal to the previous charge to be contained therein until required in one of reaction zones 9 or 10.

Metering zone 4 can be any one of the constant volume feeders known in the art. It can be manually operated or operated by automatic means. A typical metering device operative in metering zone 4 is a ball feeder of the type described in U.S. 3,167,398 which features a body having an inlet and an outlet, a member containing a metering chamber rotatable within the body, a chamber extending between and communicating with the inlet and outlet in at least two positions and a piston slidably fitted into the chamber and movable responsive to flow through the inlet to close the outlet in each of the noted positions. The above description can take the form of a valve being fitted with a plug, said plug being drilled such that the drilled portion of the plug can be positioned to provide a clear opening from inlet to outlet of the valve. The drilled portion of the plug is then fitted with a piston, which can take the form of a ball, and seats such that the ball can rest against the seat on either the inlet or outlet side of the valve. In operation, material under pressure, such as in this case a slurried catalyst, enters the valve body through the inlet side thus driving the ball toward the outlet side causing the ball to seat against the above-described ball seats. In this position there is provided a fixed volume available for catalyst to occupy. When the material in the space is desired to be admitted to the outlet portion of the valve, the plug is rotated and positioned such that the material side of the valve is positioned on the outlet and the ball side is positioned facing the inlet of the valve. At this point, the pressure on the inlet side forces the ball toward the outlet side of the valve, which in turn forces the material in the space out of the valve body.

This invention is especially applicable to the process of feeding a catalyst or catalyst component to a batch polymerization or copolymerization process. In such a process the reactant can be a hydrocarbon monomer suitable for polymerization, such monomers ordinarily being those having 2 to 8 carbon atoms per molecule, such as propylene, butylene, ethylene, pentene, butadiene, isoprene, and the like. Also, such a batch polymerization involves feeding catalyst to the reactor slurried in diluent. Diluents useful for this purpose include alkanes having 3 to 10 carbon atoms per molecule, for example butane, pentane, hexane, heptane, and the like. In addition, one catalyst component useful in polymerizing propylene is aluminum activated titanium trichloride ($TiCl_3 \cdot \frac{1}{3} AlCl_3$) wherein it as well as other catalyst components is held in an 80 to 90 percent by weight slurry in storage and diluted to a 6 to 10 percent by weight slurry in the dispersion zone of this invention. The method of this invention is particularly suited for using the same diluent used in slurrying the catalyst to sweep the slurried catalyst from the metering zone to the dispersion zone.

Where the monomer being polymerized is propylene it is preferred to use hexane, pentane, or isopentane as the diluent.

EXAMPLE

It is proposed that into a stirred batch reactor of approximately 8,000-gallon capacity containing therein approximately 195,000 pounds of propylene and 36 pounds of diethylaluminum chloride at a temperature of 130° F. and at a pressure of 445 p.s.i.g., there be introduced the contents of a small mixing vessel of approximately 20-gallon capacity having therein a 10 percent by weight slurry of aluminum-activated titanium trichloride, having the approximate formula $TiCl_3 \cdot \frac{1}{3} AlCl_3$, in isopentane. The slurry in the mixing vessel is blown into the reactor by introducing into the mixing vessel by way of line 13 nitrogen gas under a pressure of approximately 600 p.s.i.g., at a rate of approximately 15 standard cubic feet per minute.

The slurry in the mixing vessel is obtained by introducing therein 15 pounds of 80 percent by weight aluminum activated titanium trichloride slurried in isopentane which is held in a storage vessel at a temperature of approximately 100° F. and at a pressure of approximately 600 p.s.i.g. The slurry is transferred from the storage vessel by pressure differential supplied by isopentane in line 5 introduced into the storage vessel at a pressure of approximately 650 p.s.i.g. Isopentane, 150 pounds of which introduced by line 6 into line 3 at a pressure of approximately 650 p.s.i.g. dilutes the slurry from the storage vessel in order to obtain the low concentration slurry desired in the mixing vessel.

Reasonable variations and modifications are possible within the scope of my invention which sets forth a method for single step introduction of catalyst component charge required in a batch polymerization reaction.

That which is claimed is:

1. In a process for introducing a catalyst component into a batch reaction zone comprising the steps of transferring said catalyst component from a storage zone to a metering zone, transferring said component through said metering zone until a predetermined total quantity of said component passes through said metering zone, and transferring said component from said metering zone to said batch reaction zone; the improvement which comprises (1) transferring all of said predetermined total quantity of said component from said metering zone to a dispersion zone; (2) admixing with said componnet in said dispersion zone a measured quantity of a diluent inert to said component to produce a slurry of said catalyst component and diluent; (3) agitating said slurry in said dispersion zone so as to maintain said slurry in a dispersed condition in said dispersion zone; and (4) discharging said slurry in its entirety from said dispersion zone into said batch reaction zone in a single step.

2. The process of claim 1 wherein said slurry is discharged into said batch reaction zone by an inert gas at a pressure in excess of the pressure in said reaction zone, said gas being introduced into said dispersion zone until the entire quantity of said slurry is introduced into said reaction zone.

3. The process of claim 2 wherein said gas pressure is at least 50 p.s.i.g. in excess of said pressure in said reaction zone.

4. The process of claim 3 wherein said catalyst component is present to the extent of 80 to 90 percent by weight of said slurry.

5. The process of claim 4 wherein said catalyst component is present to the extent of 6 to 10 percent by weight of said slurry.

6. The process of claim 5 wherein said catalyst component is aluminum-activated titanium trichloride, said diluent is isopentane and said inert gas is nitrogen.

7. The process of claim 6 wherein there is conducted in said reaction zone a two-step polymerization process comprising the homopolymerization of propylene followed by the copolymerization of propylene and ethylene, said polymerization process being initiated by said single-step discharge of said slurry into said reaction zone.

References Cited

UNITED STATES PATENTS

| | | | |
|---|---|---|---|
| 3,318,976 | 5/1967 | Short | 260—878 B |
| 3,194,434 | 7/1965 | Evanson | 222—399 |
| 3,116,853 | 1/1964 | Tatibana | 222—399 |

FOREIGN PATENTS

| | | | |
|---|---|---|---|
| 677,896 | 1/1964 | Canada | 260—878 |
| 820,450 | 9/1959 | Great Britain | 260—94.9 B |

JOSEPH L. SCHOFER, Primary Examiner

A. HOLLER, Assistant Examiner

U.S. Cl. X.R.

23—288 E; 222—399; 260—88.2 R, 93.7, 94.9 B, 94.9 P